(12) United States Patent
Bouniol et al.

(10) Patent No.: US 9,046,894 B2
(45) Date of Patent: Jun. 2, 2015

(54) NAVIGATION AID METHOD FOR DETERMINING THE PATH OF AN AIRCRAFT

(75) Inventors: Pierre Bouniol, Saint Hilaire du Rosier (FR); Olivier Polaert, Etoile sur Rhone (FR); Pierre-Jérôme Clemenceau, Chabeuil (FR)

(73) Assignee: Thales, Courbevoie (FR)

( * ) Notice: Subject to any disclaimer, the term of this patent is extended or adjusted under 35 U.S.C. 154(b) by 472 days.

(21) Appl. No.: 13/266,649

(22) PCT Filed: Apr. 27, 2010

(86) PCT No.: PCT/EP2010/055641
§ 371 (c)(1),
(2), (4) Date: Oct. 27, 2011

(87) PCT Pub. No.: WO2010/125073
PCT Pub. Date: Nov. 4, 2010

(65) Prior Publication Data
US 2012/0041676 A1 Feb. 16, 2012

(30) Foreign Application Priority Data
Apr. 28, 2009 (FR) ...................................... 09 02066

(51) Int. Cl.
| G05D 1/10 | (2006.01) |
| G05D 1/06 | (2006.01) |
| G08G 5/02 | (2006.01) |
| G01C 21/12 | (2006.01) |
| G05D 1/00 | (2006.01) |

(52) U.S. Cl.
CPC .............. *G05D 1/0653* (2013.01); *G08G 5/025* (2013.01); *G05D 1/0676* (2013.01); *G01C 21/12* (2013.01); *G05D 1/0055* (2013.01)

(58) Field of Classification Search
CPC .............. G05D 1/00; G01C 21/00; G08G 1/00
USPC .................................. 701/300–301, 466–473
See application file for complete search history.

(56) References Cited

U.S. PATENT DOCUMENTS

| 3,786,505 A | * | 1/1974 | Rennie | 342/33 |
| 5,414,631 A | * | 5/1995 | Denoize et al. | 701/301 |
| 5,623,414 A | * | 4/1997 | Misra | 701/478 |

(Continued)

FOREIGN PATENT DOCUMENTS

WO 2008/040658 A1 4/2008

*Primary Examiner* — John Q Nguyen
*Assistant Examiner* — Michael Ng
(74) *Attorney, Agent, or Firm* — Baker & Hostetler LLP

(57) ABSTRACT

Navigation aid method for determining, by an instruction giver, the path of an aircraft initially following a predetermined path in an approach phase and upon which are defined a safety altitude and an alarm limit, said aircraft including a navigation system of the INS/GNSS type including a satellite information receiver and at least one inertial unit producing position information, said method including determining a future path; estimating predicted protection radii on the future path are estimated, starting at the calculation time in the case of a critical situation, in terms of position information, which starts at the calculation time; calculating a limit time after which the predicted protection radius is greater than or equal to the alarm limit; and calculating a limit time after which the predicted protection radius is greater than or equal to the alarm limit.

14 Claims, 3 Drawing Sheets

(56) References Cited

U.S. PATENT DOCUMENTS

| | | | |
|---|---|---|---|
| 6,456,940 B1* | 9/2002 | Higgins | 701/301 |
| 6,980,892 B1* | 12/2005 | Chen et al. | 701/9 |
| 7,693,614 B2* | 4/2010 | Turung | 701/3 |
| 7,908,046 B2* | 3/2011 | Huynh et al. | 701/14 |
| 8,027,783 B2* | 9/2011 | Closse et al. | 701/120 |
| 2005/0216138 A1* | 9/2005 | Turung | 701/3 |
| 2006/0253232 A1* | 11/2006 | Gerrity et al. | 701/16 |
| 2008/0294306 A1* | 11/2008 | Huynh et al. | 701/3 |
| 2010/0174426 A1* | 7/2010 | Turung | 701/11 |

* cited by examiner

NAVIGATION AID METHOD FOR DETERMINING THE PATH OF AN AIRCRAFT

CROSS-REFERRENCE TO RELATED APPLICATIONS

This application is a National Stage of International patent application PCT/EP2010/055641, filed on Apr. 27, 2010, which claims priority to foreign French patent application No. FR 09 02066, filed on Apr. 28, 2009, the disclosure of each of which are incorporated by reference in their entireties.

FIELD OF THE DISCLOSED SUBJECT MATTER

The invention is within the field of aeronautics and more particularly within the field of navigation aid methods for determining the path of an aircraft. The term "navigation system" refers to a system based on equipment for calculating the position of the aircraft and transmitting this information to an instruction giver which can be a pilot or an automatic pilot system.

BACKGROUND

An aircraft usually follows a predetermined flight plan comprising a detailed description of the predetermined path to follow in the context of a previously planned flight. It notably comprises a path, which is a chronological sequence of waypoints described by their position, altitude and passage time. These paths are allocated with air corridors extending around this route. The size of the air corridors allocated to the aircraft depends on the flight phase (takeoff, cruise, approach, landing). Given the saturation of airspace, there is a tendency to reduce the size of the corridors in order to open a larger number of corridors in airspace.

There are procedures of the RNP (Required Navigation Performance) type whose purpose is to reduce the size of the air corridor allocated to an aircraft, to reduce the spacing between aircraft and the clearance of obstacle margins (distances). The big advantage of RNP procedures is that they allow an aircraft to fly to and from places of difficult access with good guarantees in terms of safety. These procedures also make it possible to carry out curved approaches and to descend lower during approach phases in order to eventually detect, at the end of the approach phase, the landing system or in order that the pilot can decide, according to the visibility, if he can make the landing.

In these RNP procedures, an air volume is allocated to the aircraft for each phase of the flight. In order to maneuver inside the airspaces defined in an RNP procedure, the navigation system of the aircraft must be capable of monitoring its performance and of comparing it with an alarm limit defined for the approach phase. The navigation system must also be capable of informing the crew or the automatic pilot system if its performance reaches the alarm limit. This makes it possible for the instruction giver to guarantee a safety level over the approach phase or to be aware that the safety level is not guaranteed.

One of the key performance factors of a navigation system is its integrity. The integrity is the ability of a system to give a warning when its performance degrades beyond a pre-defined threshold.

In order to quantify the integrity of a position measurement in aeronautical applications, where the integrity is critical, a parameter called the "protection radius" of the position measurement as well as an associated detection probability (that is to say a given level of integrity) are used. By definition, the probability that the position error exceeds the announced protection radius without an alarm being sent is less than this probability value. For example, in FIG. 1 there is shown a protection radius R for an RNP 0.1 procedure. In order to follow an RNP 0.1 procedure, it is necessary that the probability that the path error E, in the horizontal direction, exceeds 0.2 nautical miles (i.e. 0.2N), without an alarm being sent to the instruction giver, should be less than $10^{-5}$ per hour. The position error E is the distance between the true position $P_{true}$ and the desired theoretical position $P_{th}$. An alarm limit Rlim is therefore defined for this procedure which is equal to 0.2 Nautical Miles. If a protection radius R(t) calculated by the navigation system, for the probability of appearance of error less than or equal to $10^{-5}$ per hour, exceeds this alarm limit Rlim, the instruction giver is informed of it. It will be noted that one nautical mile is equal to 1,852 meters.

To this end, in RNP procedures, the navigation systems usually calculate continuously the position of the aircraft and the value of the horizontal and/or vertical protection radii associated with this position, for a given integrity level.

In order to follow RNP procedures, the aircraft can be equipped with navigation systems of the INS/GNSS (Inertial Navigation System and Global Navigation Satellite System) type. INS/GNSS navigation systems comprise at least one inertial system (inertial sensors and associated calculator) and a receiver of satellite information. These systems are based on satellite information and/or inertial information in order to determine the successive positions of the aircraft. The information coming from satellites makes it possible to provide accurate position measurements with a good level of integrity (small protection radius or a low error probability). On the other hand, the satellite navigation information is subject to being lost. It is said that the satellite navigation information is lost when the satellite navigation information is insufficient for the navigation system to calculate the position of the aircraft from the information coming from the visible satellites. This is the case for example when the receiver of position information from the satellites is defective or when certain satellites are hidden by obstacles and the receiver sees less than four satellites or when the receiver sees more than four satellites but they are in a configuration which does not make it possible to calculate the position of the aircraft (for example when all of the visible satellites are aligned).

As for the information coming from the inertial systems, this makes it possible to provide position measurements continuously but these measurements drift in the long term. Generally, the navigation system calculates the position of the aircraft on the basis of satellite information and, when the satellite navigation information is lost, the position calculations are carried out on the basis of inertial information.

A navigation system which makes it possible to follow RNP procedures is known from the patent application WO2008/040658. The navigation system is a hybrid system of the closed loop INS/GNSS hybrid type. The hybridizing consists in mathematically combining the position and speed information provided by the inertial system and the measurements provided by a satellite positioning receiver in order to obtain the position measurements by taking the advantages of both systems, that is to say the continuity of the information provided by an inertial receiver and the accuracy of the information provided by the satellites. This navigation system continuously corrects the drift of the inertial information by basing itself on the information coming from the satellites. This navigation system is capable of continuously monitoring its performance by calculating horizontal and vertical protection radii for a given level of integrity and by comparing these protection radii with an alarm limit defined over the current flight phase.

Over each approach phase is defined a Decision Altitude (DA), defined with respect to the mean sea level, or a Decision Height (DH), defined relatively with respect to the destination runway threshold, which is the altitude or height at which the aircraft is at the end of the approach procedure and at which the pilot will decided whether or not to commence the landing phase. This height depends on the type of approach (non-precision approach, precision approach) and on the chosen means of approach (visual or instrument). For each airport, a Minimum Safety Altitude (MSA) is defined which is the altitude which the aircraft must be at to be sure of not striking a relief, that is to say in order to guarantee its safety. The safety altitude is conditioned by the relief situated in the vicinity of the runway upon which the landing is planned. At present, when an aircraft which is following an RNP approach phase loses the satellite navigation information the instruction giver is informed of this and then decides either to continue the current flight phase, but without guaranteeing the safety level imposed over the approach phase, or to stop the current flight phase by simultaneously extracting himself from the predetermined path in order to reach the safety altitude.

If, for example, on a predetermined path, shown in thick continuous line in FIG. 2, followed during an approach phase using the RPN procedure, an aircraft comprising a navigation system based on satellite and inertial information loses the satellite navigation information at a loss time tp, the instruction giver is warned of the loss of information and he instantaneously interrupts his initial path in order to reach a safety altitude hsafe by following a path called the "extraction path", shown in thick dotted line. When the aircraft has reached the safety altitude, he will either attempt a new approach procedure or abandon the current approach in order to follow a third path.

This type of procedure has the disadvantage of interrupting the current approach when the satellite navigation information is no longer available, even if the navigation system would finally have been able to guarantee, due to the hybridizing, the safety conditions required over the approach phase up to the end of this phase. Moreover, if the current approach is not interrupted, the safety conditions are no longer guaranteed. This lengthens the duration of flights and results in additional costs in terms of fuel, crew remuneration and saturation of airspace.

SUMMARY

The purpose of the present invention is to overcome the aforesaid disadvantages.

To this end, the invention relates to a navigation aid method for determining, by an instruction giver, the path of an aircraft initially following a predetermined path in an approach phase and upon which are defined a safety altitude and an alarm limit, said aircraft comprising a navigation system of the INS/GNSS type comprising a satellite navigation receiver and at least one inertial unit, said navigation system being capable of determining, at a calculation time, the position of the aircraft, of calculating an associated protection radius and of comparing it with the alarm limit, said method being characterized in that it comprises the following steps:

a future path is determined,
predicted protection radii on the future path are estimated, starting at the calculation time in the case of a critical situation, in terms of position information, which starts at the calculation time,
a limit time after which the predicted protection radius is greater than or equal to the alarm limit is calculated,
a limit extraction time which corresponds to the maximum time by which the aircraft must leave the predetermined path in order to be able to reach the safety altitude by the limit time is calculated.

The method according to the invention can moreover exhibit one or more of the following features taken together or separately:
the value of the limit time is transmitted to the instruction giver,
the value of the limit extraction time is transmitted to the instruction giver,
the predicted protection radii on the future path are predetermined,
the predicted protection radii on the future path are calculated at the given time,
the critical situation is a situation in which the satellite navigation information is lost starting from the calculation time,
the predicted protection radii are estimated by propagation of the inertial errors onto the future path,
the future path is the remaining portion of the predetermined path at the calculation time,
the future path is the path, starting at the calculation time, which is the most restricting for the critical situation in question,
the predicted protection radii are calculated from predicted horizontal and/or predicted vertical protection radii on the future path,
the alarm limit is calculated for a first level of integrity, the protection radii are calculated for a second level of integrity, the predicted protection radii are calculated for a third level of integrity and in that the second level of integrity is at least equal to the first level of integrity and the third level of integrity is equal either to the first level of integrity, or equal to the second level of integrity, or dependent on the integrity related to the critical situation in question,
the navigation system is of the hybrid type,
the instruction giver is a pilot or an automatic pilot system.

The invention also relates to a navigation system capable of implementing the method according to the invention and to an aircraft equipped with such a navigation system.

The navigation aid method according to the invention has the advantage of limiting the occurrences of extraction procedures in the case of loss of satellite navigation information. This makes it possible to reduce the saturation of airspace and to limit the costs and duration of flights.

It is in fact possible to avoid an extraction procedure when the aircraft can finish the approach phase in which it is engaged with the required safety level even though a part of the information on which the navigation system is based is lost. The same applies when the navigation system finds this information again before the performance of the navigation system reaches the alarm limit. This is for example the case when the information returns by itself (receiver interference ended, obstacle in line of sight to a satellite passed, hidden fault) or when the crew repairs the fault affecting the navigation system before the alarm limit is reached.

This method also has the advantage of leaving an additional time margin to the pilot or to the automatic pilot system for deciding whether to follow an extraction procedure or to continue following the initial path with degraded performance.

BRIEF DESCRIPTION OF THE DRAWINGS

Other features and advantages of the invention will appear on reading the following detailed description, given by way of non-limiting example and with reference to the appended drawings in which.

The same elements are indicated by the same references in all of the figures.

DETAILED DESCRIPTION

The navigation aid method for determining the path of an aircraft during an approach phase will now be described, said aircraft initially following a predetermined path on the approach phase.

Figure 1:
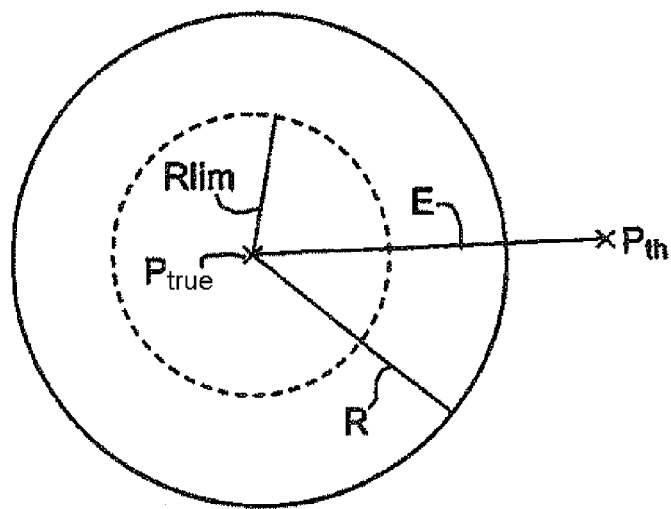
FIG. 1, already described, is a diagrammatic representation of a protection radius for a position measured at a given time, the positioning error between the measured position and the true position and an alarm limit in an RNP 0.1 procedure, FIG. 2, already described, shows the variation, as a function of time, of the altitude of an aircraft following an initial path during an approach phase and the variation in the altitude, as a function of time, over an extraction path.
Figure 2:
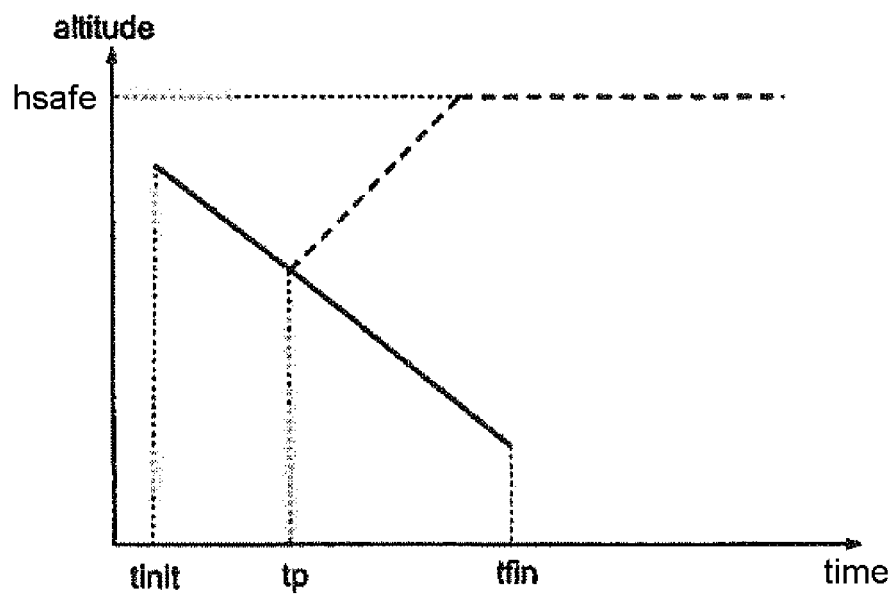
Figure 3A:
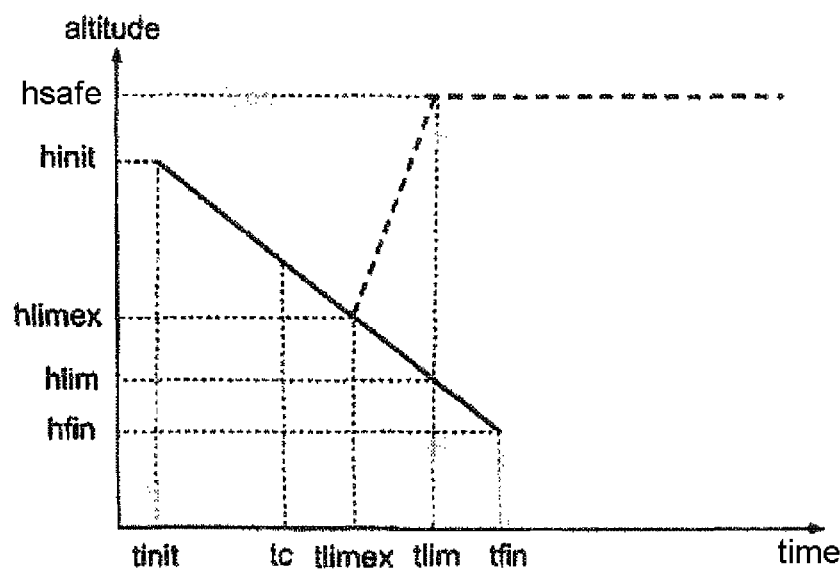
FIG. 3a shows, in continuous line, the variation of the altitude of an aircraft as a function of time on a predetermined approach path and, in dotted line, on an extraction path.
Figure 3B:
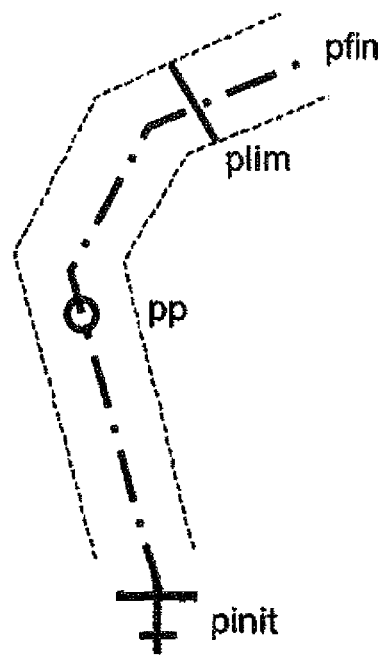
FIG. 3b is a plan view of the path of an aircraft as a function of time on a predetermined approach path.

FIG. 3a shows, in continuous line, the variation of the altitude of an aircraft as a function of time on a predetermined approach path. FIG. 3b shows a plan view of the approach path of an aircraft as a function of time on a predetermined approach path.

As can be seen in FIG. 3a, the approach path extends between an initial time tinit and a final time tfin corresponding to the start of the landing phase, which is not shown.

The initial time and the final time are associated with an initial position pinit, and a final position pfin respectively, on the path of the aircraft, as can be seen in FIG. 3b. The initial position and the final position have an initial altitude hinit and a final altitude hfin respectively, as can be seen in FIG. 3a. In the continuation of this description, "altitude" refers to the altitude of the aircraft with respect to the mean sea level. The safety altitude will therefore represent the decision altitude. As a variant, it is possible to define the altitude of the aircraft with respect to the threshold of the destination runway. The safety altitude would represent the decision height.

In this phase, the aircraft follows a predetermined path, also called the initial path, shown in thick line in FIGS. 3a and 3b, between an initial point and a final point, that is to say that all of the positions of the aircraft as well as the times of passage of the aircraft though these positions are predefined between the initial time and the final time.

Conventionally, there are defined over the current approach phase an alarm limit Rlim(t) which corresponds to a limit protection radius and a safety altitude hsafe. The alarm limit is conventionally calculated for a given first level of integrity. For an RNP procedure, the first level of integrity corresponds to a probability of error without an alarm being sent of less than $10^{-5}$ per hour.

Figure 4:
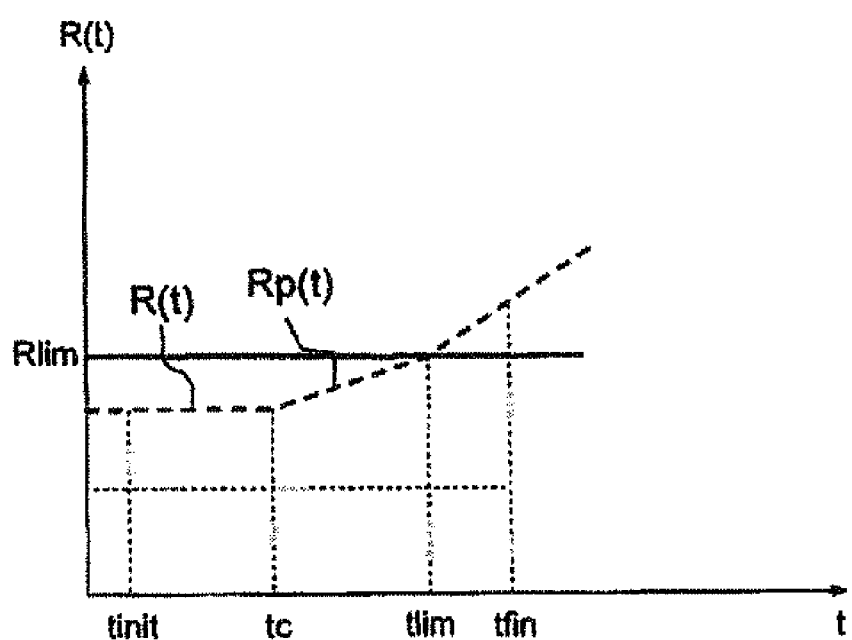
FIG. 4 shows, in dotted line, the estimation of a protection radius as a function of time and, in solid line, an alarm limit defined on the approach phase shown in FIGS. 3a and 3b.

The alarm limit is either constant over the path (as shown in FIG. 4 which will be described below), or variable according to the position on the path, that is to say as a function of time. It is easily understood that the safety level required at low altitude is greater than at high altitude or, in other words, the limit protection radius is smaller at low altitude.

Conventionally, the aircraft is equipped with a navigation system of the INS/GNSS type, comprising one or more inertial units and a satellite information receiver and capable of basing itself on satellite information and/or on inertial information for calculating the successive positions occupied by the aircraft. The navigation system is also capable of monitoring its performance by associating with a position measurement calculated at a given time, a protection radius determined for a second given level of integrity which can be different from the first level of integrity. Preferably, the level of integrity used as a basis for calculating the protection radius is at least equal to the level of integrity on the basis of which the alarm limit is calculated. In other words, the basis used for calculating the protection radius is a probability of appearance of error, without an alarm being sent, of less than or equal to the probability of appearance of error used for calculating the alarm limit. Conventionally, the second level of integrity corresponds to a probability of appearance of error without an alarm being sent of $10^{-7}$ per hour.

The navigation system is capable of comparing the calculated protection radii with the alarm limit defined on the current approach phase. Advantageously, the navigation system is capable of warning the navigation system when, at a given time, its performance is poorer than the first performance level.

Conventionally, there is calculated, at a calculation time tc, a horizontal protection radius Rh(tc) and/or a vertical protection radius Rv(tc) associated with the position value calculated at that same time, for a given second level of integrity. A protection radius R(tc) dependent on the horizontal protection radius Rh(tc) and/or the vertical protection radius Rv(tc) is defined. The navigation system is capable of comparing the protection radius R(tc) with the alarm limit Rlim(tc).

The protection radius can preferably depend on the vertical protection radius when it is desired to land and to have high-performance position measurements in the vertical direction. The protection radius can preferably be defined as a function of the horizontal protection radius, when it is desired to pass through a zone that is restricted in the horizontal direction (for example between two mountains). The protection radius can also depend on a combination between a horizontal radius and a vertical radius. In the combination, the vertical and horizontal protection radii are weighted as a function of the geography of the location.

The performance of the navigation system is calculated by the navigation system itself. The navigation system is, for example, a positioning system based on a hybrid system of the INS/GNSS type as described in the patent application WO2008/040658.

More precisely, this navigation system comprises a positioning system comprising:
- a satellite navigation receiver receiving signals from a constellation of N followed visible satellites,
- an inertial unit comprising an inertial measuring unit delivering angle increments and speed increments and a virtual platform receiving the angle increments and the speed increments;
- a barometric module delivering barometric altitude measurements,
- a Kalman hybridizing filter,
- a set of N secondary filters,
- a calculating module.

The inertial measuring unit comprises gyrometers and accelerometers: the angle increments are delivered using the gyrometers and the speed increments are delivered on the basis of accelerometer information.

The virtual platform produces inertial positioning and speed points, PPVI. The GNSS satellite navigation receiver delivers raw signal measurements transmitted by the satellites, i denoting a satellite index and being included between 1 and N, sent to the Kalman hybridizing filter.

The Kalman hybridizing filter estimates the errors produced on the positions PPVI and it produces:
 a state vector VS corresponding to the errors of the hybrid system, obtained by observing the differences between the inertial positioning and speed points PPVI and the corresponding raw measurements;
 a variance-covariance matrix, MHYP, of the error produced in the estimation of the state vector VS,
 a hybrid correction which comprises an estimation of the state vector VS.

The arrangement and functions of the Kalman filters and of the secondary filters are described in the patent application WO2008040658. The hybrid output of the navigation system corresponds to the inertial positioning and speed points PPVI which are the positions and speeds measured by the navigation system.

The calculation module receives the hybrid parameters and the variance-covariance matrix and determines hybrid position protection values from the hybrid position contained in the state vector as is described in the patent application WO2008040658. These calculations are summarized below. Only the calculation of a horizontal hybrid position protection radius will be described. The calculation of a vertical hybrid position protection radius is similar.

A first auxiliary protection radius $Rh_{H0}$ is evaluated in the absence of a satellite failure, a hypothesis commonly denoted $H_0$. This is the hypothesis according to which none of the raw measurements are erroneous.

The first auxiliary protection radius $Rh_{H0}$ is directly related to the variance of the speed and to the probability $P_{ni}$ that this error exceeds the protection radius. It is the coefficient of the diagonal of the variance-covariance matrix P which corresponds to the measured position. The standard deviation $\sigma$ is the square root of this variance and is therefore derived from the matrix P of the hybridizing filter. An auxiliary horizontal protection radius is determined under the hypothesis called H1 according to which one of the raw measurements MBi (coming from a satellite i) is erroneous. The hybrid horizontal position protection radius is determined as a maximum of the hybrid horizontal auxiliary protection radii. The determination of the maximum is based on the determination of a circle enveloping a confidence ellipse in a horizontal plane. The confidence ellipse is determined from the variance-covariance matrix of the hybrid position and a sought probability value.

Advantageously, the determination of the auxiliary horizontal protection radius is based on a desired value of probability of false alarm and on a desired value of probability of missed detection. Advantageously, the determination of the auxiliary horizontal protection radius $Rh_{H0}$ is based on a desired value of probability of missed detection and on a value of probability of occurrence of an undetected satellite fault.

In the navigation aid method according to the invention, the navigation system estimates what the performance of the navigation system would be, for a given third level of integrity, on a future path starting at a given calculation time tc (corresponding to the current time), in a situation that is critical in terms of position information, said situation starting at the calculation time. "Position information" refers to the information produced by the satellite and/or inertial information receivers.

"Critical situation" refers to a situation in which a portion of the information on which the navigation system is based for calculating the position of the aircraft is lost starting from the calculation time tc. In such a situation, the performance of the system would become significantly degraded on the future path (that is to say that the protection radius would increase for a given integrity level). The critical situation which is assumed for calculating predictions is chosen either at the moment of the prediction calculation or before the flight (it is then predetermined).

The critical situation is for example a situation in which the satellite navigation information is lost starting from the calculation time tc. In fact, it is the satellite navigation information which provides the precision and the integrity to the position measurements carried out by a navigation system of the INS/GNSS type. When the satellite navigation information is lost, the navigation system calculates the positions of the aircraft on the basis of the inertial information which drifts. It is therefore when the satellite navigation information is lost that the performance of the navigation system for calculating position degrades fastest.

The future path is the future portion of the initial path, that is to say the remaining portion of the predetermined path at the time tc. As a variant, the future path is the most restricting path corresponding to the critical situation, that is to say the path upon which the performance of the navigation system, based on the remaining information for calculating the protection radii, drops fastest. For example, when the critical situation is the situation in which the satellite navigation information is lost, the path upon which the performance of the navigation system, based solely on the inertial information for calculating the position of the aircraft, reduces fastest is an about-turn starting at the calculation time tc. This variant makes it possible to estimate the worst future degradations of the performance of the navigation system in the critical situation in question.

The estimations of the performance of the navigation system on the future path, starting at the given time tc, are expressed by means of predicted protection radii Rp(t) for a given third level of integrity. The predicted protection radii Rp(t) are predetermined on the future path. Tables comprising the variation of the protection radius as a function of time in the case of a critical situation, on a future path, are made available to the navigation system.

As a variant, the predicted protection radii Rp(t) are calculated by prediction, at a calculation time tc, for a third level of integrity. Advantageously, the predicted protection radii are calculated by continuous prediction, that is to say at each calculation time. The calculation times are regularly distributed over the duration of the path and spaced from each other by a time interval dt.

For example, the predicted protection radii Rp(t) are calculated by propagation of the inertial errors on the future path. More precisely, knowing the future path, the position points and the calculated protection radii Rp(tc−dt) are taken at the time tc−dt preceding the calculation time tc by means of the INS/GNSS hybrid positioning system described above and the inertial errors are projected along the future path. For example, in the case of a navigation system of the hybrid INS/GNSS type, estimated positions Pp(t) are calculated on the future path. For this purpose, the Kalman hybridizing filter is supplied, starting from the calculation time, with the positioning points on the future path instead and in place of the inertial positioning points PPVI. In this case, the Kalman filter no longer receives an input of satellite navigation information. The Kalman hybridizing filter calculates predicted positions Pp(t) instead of inertial positioning points PPVI and predicted variance-covariance matrices of the horizontal and vertical position errors of the future path. Predicted horizontal Rph(t) and vertical Rpv(t) protection radii are calculated from the predicted variance-covariance matrices of the horizontal and vertical position errors on the future path in the same way as the horizontal and/or vertical protection radii are calculated from variance-covariance matrices of the horizontal and vertical position errors. The predicted protection radii Rp(t) are calculated from the horizontal and/or vertical protection radii. The estimations of the predicted protection radii on the future path are made for a third level of integrity.

The third level of integrity is either equal to the second level of integrity, or equal to the first level of integrity, or equal to a level of integrity depending on the critical situation in question. For example, the probability that the satellite navigation information is lost is equal to $10^{-4}$ per hour. Instead of calculating the protection radius for an error probability equal to $10^{-7}$ per hour (second level of integrity), it is therefore possible to calculate the protection radius for an error probability equal to $10^{-3}$ per hour; in fact the probability of information failure no longer has to be taken into consideration since it is already effective and the probability of having a second satellite failure is equal to $10^{-8}$ per hour and therefore lower than the requirements issued by the aeronautical authorities. A limit time tlim is determined from the estimations of future performance of the navigation system on a future path in a critical situation. The limit time tlim is the time after which the protection radius is greater than or equal to the alarm limit. At the limit time tlim, the predicted position of the aircraft on the predefined path is associated with the limit position plim, whose altitude is the limit altitude hlim.

FIG. 4 shows an example of variation, as a function of time, of the protection radius R(t), on the future path, before the calculation time tc and the variation, as a function of time, of the predicted protection radius Rp(t) after the calculation time tc, the estimations of this protection radius being calculated at the time tc. This figure also shows the variation, as a function of time, of the alarm limit time Rlim on the future path. The limit time tlim is the time at which the predicted protection radius Rp(tlim) is equal to the alarm limit Rlim(tlim).

The navigation system supplies the value of the limit time to the instruction giver. This information is made available to the pilot, for example, by means of a visual or audio interface or it is provided as an item of input data to a calculator of a navigation system. The limit time is calculated at each time of calculation of the position by the navigation system. The instruction giver therefore has at all moments the value of the limit time at that moment.

If at a given time the instruction giver is informed that the satellite navigation information is lost, he can have knowledge of the value of the limit time and know if he can finish the approach phase whilst guaranteeing the safety level required on it (when the limit time is later than the final time) or if he will not be able to guarantee the required safety level up to the end of the approach phase (when the limit time is prior to the final time). He also knows up to which stage of the approach phase he will be able to guarantee the safety level. The instruction giver, knowing the limit time, is not obliged to exit the initial path in order to reach a safety altitude when the satellite navigation information is lost.

Advantageously, an extraction limit tlimex is calculated corresponding to a limit extraction position plimex and to a limit extraction altitude hlimex on the initial path. The aircraft must exit the predefined path no later than the limit extraction time in order to reach the safety altitude by the limit time tlim. The limit extraction time depends on the given calculation time, the altitude of the aircraft at the given time, the safety altitude and the maximum climb speed of the aircraft.

The maximum climb speed of the aircraft depends on the horizontal flight plan, the dynamics of the aircraft and/or climb speed conditions imposed between these two times. The horizontal flight plan is the projection on the ground of the flight plan. The horizontal flight plan depends on the relief, speed conditions imposed on this path and/or the dynamics of the aircraft.

In order to calculate the extraction limit time, a straight line is plotted in the vertical plane, as can be seen in thick dotted line in FIG. 3a. This straight line passes through a point whose coordinates are the safety altitude and the limit time and whose slope is equal to the maximum climb speed of the aircraft. The climb speed is equal to the variation of altitude per second. This straight line intersects the initial path at a point corresponding to the extraction limit altitude hlimex and to the limit extraction time tlimex.

It is possible to refine the value of the extraction limit time by including in the calculation of this time the time to make the climb maneuver and possible speed variations in the vertical direction.

The second safety level required at this altitude is less important than on the initial path.

The value of the extraction limit time is then transmitted to the instruction giver. If, at a given time, the instruction giver is informed that the satellite navigation information is lost, he knows at what time he will have to exit the initial path in order to reach the safety altitude with total safety. He can choose either to continue the initial path up to this time whilst waiting for the information to return, or to exit the initial path before the extraction limit time, or to continue the extraction path after the extraction limit time knowing that he will not be able to have reached the safety altitude at the limit time.

As a variant, the extraction limit time is calculated only when the limit time is later than the final time.

The instruction giver is, for example, the pilot or an automatic pilot system.

In the patent application, the case has been described in which the limit time is calculated at each given position calculation time over the whole of the approach path. As a variant, the limit time is calculated at each position calculation time only after the time at which the altitude of the aircraft on the extraction path is below the safety altitude.

The invention claimed is:

1. A navigation aid method for determining, by an instruction giver, the path of an aircraft initially following a predetermined path in an approach phase and upon which are defined a safety altitude and an alarm limit, said aircraft comprising a navigation system of an Inertial Navigation System/Global Navigation Satellite System (INS/GNSS) type comprising a satellite navigation receiver and at least one inertial unit, said method comprising:
   determining a current position of the aircraft;
   determining a future path of the aircraft from the current position;
   estimating a predicted protection radii on the future path, starting at a calculation time in a case of a critical situation, in terms of a loss of GNSS position information, which starts at the calculation time;
   calculating a limit time after which the predicted protection radius is greater than or equal to the alarm limit;
   calculating a limit extraction time that corresponds to a maximum time after which the aircraft must leave the predetermined path in order to be able to reach the safety altitude by the time limit; and transmitting the value of the limit extraction time to the instruction giver.

2. The navigation aid method according to claim 1, wherein the critical situation is a situation in which the satellite navigation information is lost starting from the calculation time.

3. The navigation aid method according to claim 2, further comprising estimating the predicted protection radii by propagation of the inertial errors onto the future path.

4. The navigation aid method according to claim 1, wherein the navigation system is of a hybrid type.

5. The navigation aid method according to claim 4, wherein the instruction giver is a pilot or an automatic pilot system.

6. The navigation aid method according to claim 1, further comprising transmitting the value of the limit time to the instruction giver.

7. The navigation aid method according to claim 1, wherein the predicted protection radii on the future path are predetermined.

8. The navigation aid method according to claim 1, further comprising calculating the predicted protection radii on the future path at the given time.

9. The navigation aid method according to claim 1, wherein the future path is the remaining portion of the predetermined path at the calculation time.

10. The navigation aid method according to claim 1, wherein the future path is the path, starting at the calculation time, which is the most restricting for the critical situation in question.

11. The navigation aid method according to claim 1, further comprising calculating the predicted protection radii from predicted horizontal and/or predicted vertical protection radii on the future path.

12. The navigation aid method according to claim 1, further comprising:
    calculating the alarm limit for a first level of integrity;
    calculating the protection radii for a second level of integrity;
    calculating the predicted protection radii for a third level of integrity, wherein the second level of integrity is at least equal to the first level of integrity; and
    the third level of integrity is either equal to the first level of integrity, or equal to the second level of integrity, or dependent on the integrity related to the critical situation in question.

13. A navigation system configured to perform the method of claim 1.

14. An aircraft equipped with a navigation system of claim 13.

* * * * *